May 1, 1928.  
J. WASHINGTON  
CULTIVATOR  
Filed Jan. 3, 1927
1,667,878
2 Sheets-Sheet 2
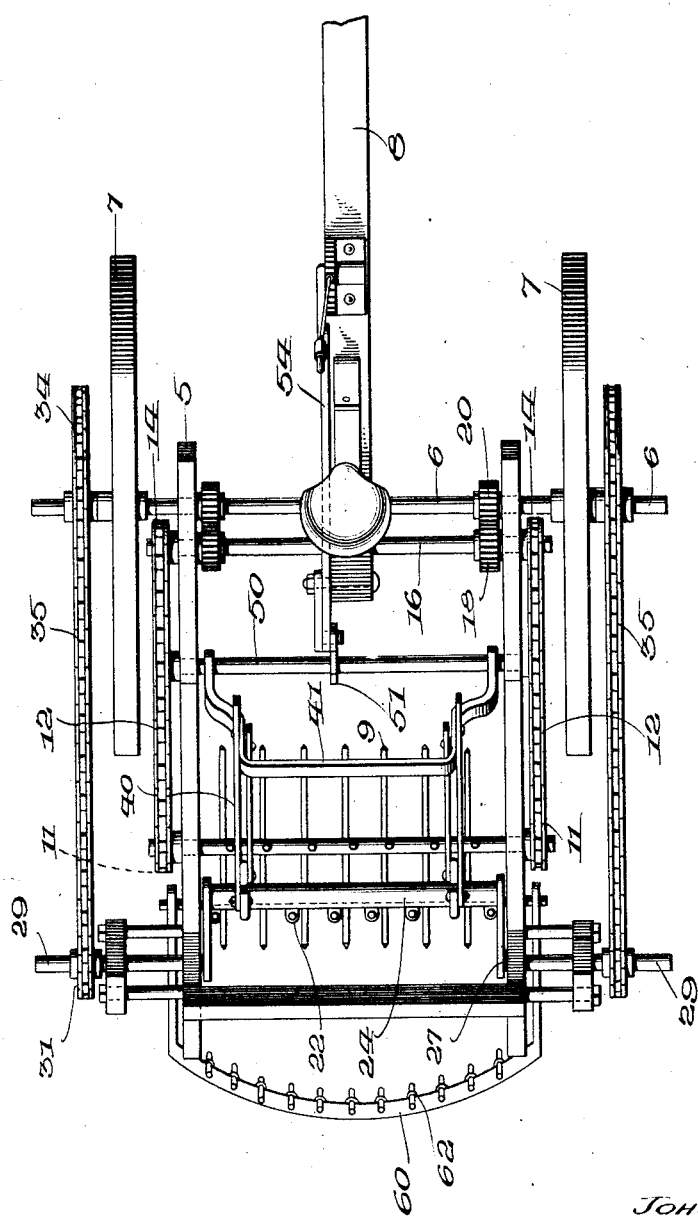

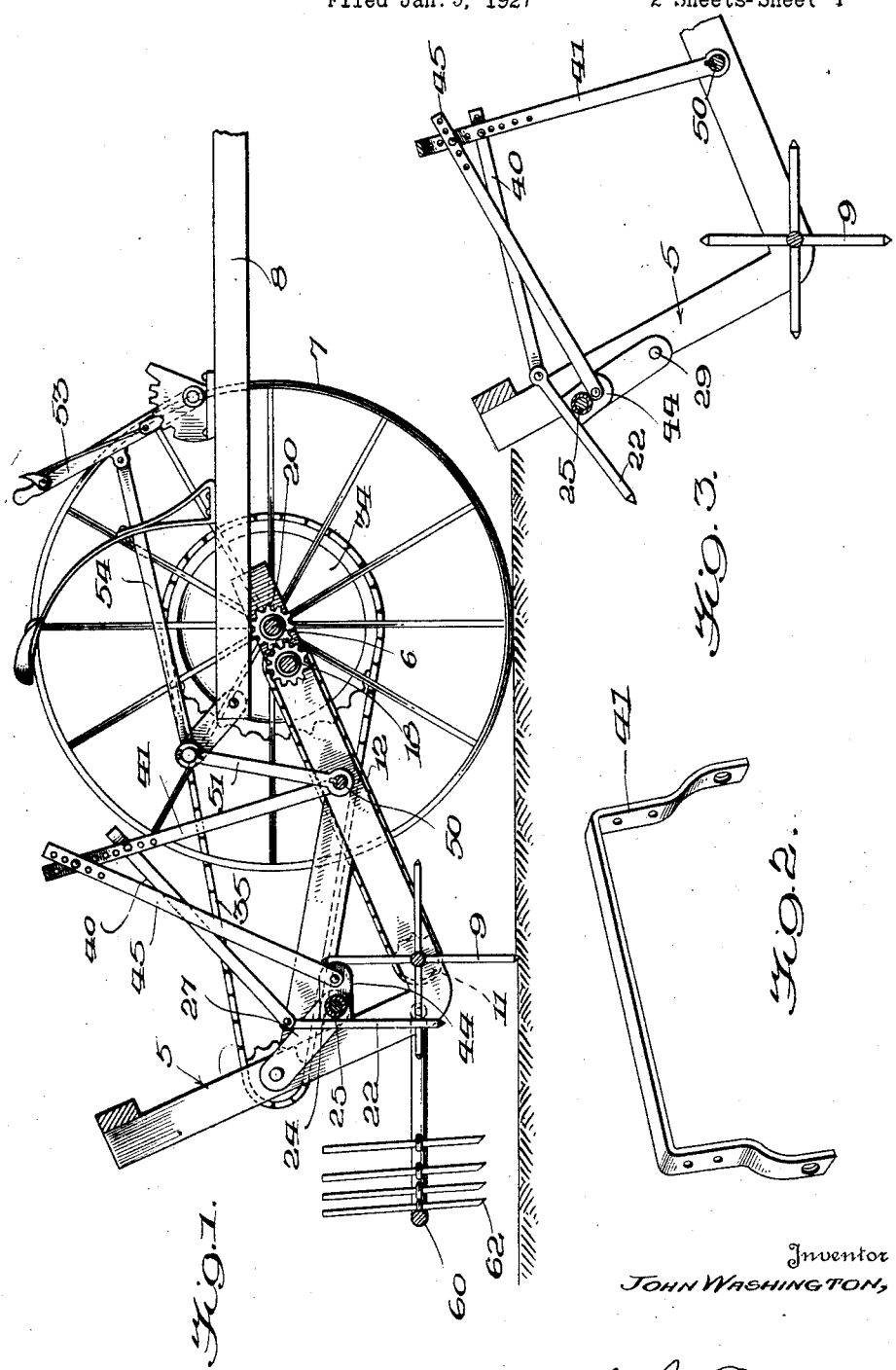

Patented May 1, 1928.

1,667,878

UNITED STATES PATENT OFFICE.

JOHN WASHINGTON, OF WACO, TEXAS.

CULTIVATOR.

Application filed January 3, 1927. Serial No. 158,644.

This invention relates to cultivators and more particularly to a means for removing noxious growths, such as weeds and roots from the ground.

Briefly stated an important object of the invention is to provide a cultivator having novel means whereby the ground engaging teeth are positively cleaned each time they move out of engagement with the ground so as to permit of the most efficient use of the ground engaging teeth.

Other objects and advantages will be apparent during the course of the following description.

In the accompanying drawings forming a part of this application and in which like numerals are employed to designate like parts throughout the same, Figure 1 is a vertical sectional view through the improved cultivator.

Figure 2 is a perspective of a substantially U-shaped member employed in connection with the adjusting mechanism.

Figure 3 is a detail sectional view through the cultivator.

Figure 4 is a plan view of the cultivator.

In the drawing wherein for the purpose of illustration is shown a preferred embodiment of the invention, the numeral 5 generally designates a frame consisting principally of a pair of laterally spaced L-shaped beams to which the axle 6 is connected. Ground engaging wheels 7 have connection with the axle as shown. A tongue 8 extends forwardly from the frame and forms a means whereby the machine may be propelled by a tractor or beasts of burden.

Referring particularly to Figure 1 it will be observed that the ground engaging unit is provided with a plurality of rows of radially disposed teeth 9, the teeth of one row being arranged about ninety degrees from the teeth of the adjacent rows and being adapted to dig into the ground to pick up noxious growths such as Johnson grass, roots and weeds. In carrying out the invention the ground engaging unit is provided with a central shaft, the ends of which are rotatably extended through the side beams of the frame and have connection with sprocket wheels 11. The sprocket wheels in turn have connection with a sprocket chain 12 extended forwardly and trained about sprocket wheels 14 on the ends of a counter shaft 16.

Figure 4 illustrates that the counter shaft 14 which is rotatably connected at the end portions thereof with the sides of the beam, is provided with spur gears 18 in constant mesh with the spur gears 20 mounted on the axle 6. Thus the turning of the axle 6 in a clock-wise direction will result in the turning of the counter shaft 16 in a counter clock-wise direction. The connection between the counter shaft 16 and the shaft of the ground engaging unit results in the turning of the ground engaging unit in a counter clock-wise direction, so that in the operation of the machine the weeds and other noxious growths will be engaged with force and picked up by the teeth.

The material which clings to the rotatable ground engaging unit 9 is subjected to the action of a comb 22 consisting of a plurality of substantially parallel teeth welded or otherwise secured to a sleeve 24 rotatable on a connecting shaft 25. Inspection of Figures 1 and 4 will show that the ends of the shaft 25 are secured to the outer terminals of cranks 27 carried by counter shafts 29. Figure 4 in particular illustrates that the counter shafts 29 are provided with sprocket wheels 31 and that the axle 6 is provided with sprocket wheels 34, these sprocket wheels being connected by sprocket chains 35. The sprocket wheel 34 is clearly shown to be four times the diameter of the sprocket wheel 31 so that the cranks 27 will be turned at four times the speed of the rotatable ground engaging unit 9. In further explaining this feature of the invention it is pointed out that the connection between the rotatable ground engaging unit 9 and the main wheels 7 results in turning of the ground engaging unit at the same speed as the wheels 7.

It will be seen that as the machine advances across the field to be cultivated the ground engaging unit will turn in a counter clock-wise direction and that the teeth of the comb 22 will move between the teeth of the unit 9 and remove any weeds or the like which may have attached themselves thereto. The movement of the comb 22 through the teeth of the unit 9 is generally in the direction of turning of the teeth of the unit 9 and consequently little resistance is offered to the intermeshing of the teeth of the members 9 and 22. Continued turning of the cranks 27 will cause the comb 22 to move beyond the ends of the teeth of the unit 9 so that the material removed from the teeth of the unit 9 may be dropped to the ground.

Figures 1 and 4 clearly illustrate that the upper terminals of several of the teeth of the comb 22 are extended above the sleeve 24 to provide attaching members for links 40, the forward portions of which are adjustably connected to a U-shaped support 41. These figures also illustrate that the sleeve 25 is provided with a pair of ears 44 to which links 45 are pivotally connected. The forward ends of the links 45 are adjustably and pivotally connected to the U-shaped support 41.

It is important to note that the comb 22 occupies a substantially vertical position as it approaches the teeth of the pick-up unit 9 and as the comb approaches the terminals of the material bearing teeth it is given a quick tilting movement by the links 40 and 45 to bring about the complete and thorough removal of the material from the pick-up device 9. It is believed to be obvious from an inspection of Figures 1 and 4 that the movement of the comb 22 is about a circle having as the axis thereof the shafts 29. As previously suggested the movement of the comb in a circular path is accomplished by the chain 35 and the connection of the chain with the ground engaging wheels 7.

Figure 1 clearly illustrates that the connection of the links 40 and 45 with the U-shaped member 41 is adjustable so that the quick tilting of the comb may be varied according to the will of the operator and conditions encountered.

Since the ground engaging unit 9 is turned in a counter-clockwise direction the teeth thereof are thoroughly cleaned immediately before coming into working contact with the ground thereby assuring efficient operation of the machine and the proper working of the ground.

The sides of the U-shaped support are connected to a shaft 50 having an adjusting lever 51 keyed thereto and connected with a hand lever 53 through the medium of a link 54. It is believed to be clear that adjustment of the lever 53 will result in changing the position of the shaft 50 and the parts associated therewith.

Figures 1 and 4 illustrate that a rake consisting of a substantially U-shaped frame member 60 is extended across the back of the machine and is provided with a plurality of teeth 62 adapted to pick up the loose grass, weeds, roots, and other noxious growths. The particular formation of the rake and the position of the same with respect to the comb and the ground engaging unit makes it possible for the rake to carry a substantial accumulation of weeds, etc., before it is necessary to dump the same.

In summarizing it will be seen that as the machine travels along the ground the ground engaging unit 9 will move into engagement with the roots, weeds and other noxious growths and will detach and carry the same upwardly to a position where they are engaged by the teeth of the comb 22. The machine is so timed that the comb 22 moves between the teeth of the ground engaging unit at exactly the right moment. In fact each time one of the rows of teeth of the ground engaging unit reaches a point where the material carried thereby may be easily removed, the teeth of the comb extends between the teeth of the ground engaging unit and thoroughly cleans the same. This is continued as long as the machine operates so that the ground, in addition to being effectively harrowed, is thoroughly freed from roots and the like.

Having thus described the invention, what is claimed is:

1. A machine of the character specified comprising a frame, a ground engaging unit rotatably carried thereby and having a plurality of rows of teeth adapted to extend into the ground to remove noxious growths therefrom, and a cleaning comb adapted to be extended between the teeth of the ground engaging unit, and means supporting the comb for movement bodily in an annular path.

2. A machine of the character specified comprising a frame, a ground engaging unit rotatably carried thereby and having a plurality of rows of teeth adapted to extend into the ground to remove noxious growths therefrom, a cleaning comb adapted to be extended between the teeth of the ground engaging unit, means for moving the comb in an annular path, and a holding device to maintain the comb in a vertical position during the major portion of the travel thereof.

3. A machine of the character specified comprising a frame, a ground engaging unit carried thereby and consisting of a plurality of rows of spaced teeth, a comb having teeth adapted to move between the teeth of the ground engaging unit, a sleeve supporting the comb, a comb moving device associated with the sleeve and means to support the comb in a substantially vertical position during the major portion of the movement of the same.

4. A machine of the character specified comprising a frame, wheels supporting the frame, a ground engaging unit consisting of a plurality of rows of teeth spaced approximately ninety degrees apart, a comb having teeth adapted to extend between the teeth of the ground engaging unit, an operating device for moving the comb and a link connected to the comb to maintain the same in a substantially vertical position during the major portion of the travel thereof.

5. A machine of the character specified comprising a frame, a ground engaging unit carried thereby, means for turning the ground engaging unit, a comb to clean the ground engaging unit and having a sleeve, a shaft extending through the sleeve, cranks connected to the shaft, means for turning the cranks, a link connected to the comb, a pivoted support to which the link is adjustably connected, and a second link connected to the comb and adjustably connected to the support.

6. A machine of the character specified comprising a frame, a ground engaging unit carried thereby, means for turning the ground engaging unit, a comb to clean the ground engaging unit and having a sleeve, a shaft extending through the sleeve, cranks connected to the shaft, means for turning the cranks, a link connected to the comb, a support to which the link is adjustably connected, a second link connected to the comb and adjustably connected to the support, means whereby the support may be adjusted, and a rake at the rear of the comb.

7. A machine of the character specified comprising a frame, a ground engaging unit carried thereby and consisting of a plurality of rows of spaced teeth, a comb having teeth adapted to move between the teeth of the ground engaging unit, a sleeve supporting the comb, a comb moving shaft extending through said sleeve and supporting the same, and means to support the comb in a substantially vertical position during the major movement of the same.

8. A machine of the character specified comprising a frame, a ground engaging unit carried thereby and consisting of a plurality of rows of spaced teeth, a comb having teeth adapted to move between the teeth of the ground engaging unit, a sleeve supporting the comb, a comb moving shaft extending through said sleeve and supporting the same, a crank connected to said shaft, an operating device for said crank, and means to support the comb in a substantially vertical position during the major portion of the movement of the same.

9. A machine of the character specified comprising a frame, wheels supporting the frame, a ground engaging unit consisting of a plurality of rows of teeth spaced approximately ninety degrees apart, a comb having teeth adapted to extend between the teeth of the ground engaging unit, a crank supporting said comb, means connecting the crank to one of the wheels of the machine, a link connected to the comb to maintain the same in a predetermined position during the major portion of the travel thereof, and a movable support for the link.

10. A machine of the character specified comprising a frame, wheels supporting the frame, a rotary ground engaging unit consisting of a plurality of rows of teeth, a comb having teeth adapted to extend between the teeth of the ground engaging unit, cranks supporting said comb, means connecting one of the cranks to one of said wheels, means connecting the ground engaging unit to one of the wheels of the machine, links connected to said comb to position the same, there being a support for said links.

In testimony whereof I affix my signature.

JOHN WASHINGTON.